United States Patent [19]

Ogawa et al.

[11] Patent Number: 4,780,734
[45] Date of Patent: Oct. 25, 1988

[54] CAMERA

[75] Inventors: Yukio Ogawa, Kanagawa; Toyotoshi Suzuki, Tokyo; Kiyoshi Alyfuku, Kanagawa, all of Japan

[73] Assignee: Canon Kabushiki Kaisha, Tokyo, Japan

[21] Appl. No.: 140,958

[22] Filed: Jan. 4, 1988

Related U.S. Application Data

[63] Continuation of Ser. No. 36,718, Apr. 10, 1987, abandoned.

[30] Foreign Application Priority Data

Apr. 11, 1986 [JP] Japan ............................... 61-83596
Jun. 20, 1986 [JP] Japan ............................... 62-144156

[51] Int. Cl.$^4$ ............................................. G03B 1/18
[52] U.S. Cl. ............................... 354/173.11; 354/214; 354/217
[58] Field of Search ................ 354/173.1, 173.11, 212, 354/217, 214

[56] References Cited

U.S. PATENT DOCUMENTS

| | | | |
|---|---|---|---|
| 4,304,480 | 12/1981 | Fukahori et al. | 354/173.11 |
| 4,417,793 | 11/1983 | Oyokota et al. | 354/173.1 |
| 4,460,257 | 7/1984 | Araki et al. | 354/173.11 |
| 4,504,131 | 3/1985 | Kimura | 354/173.1 |
| 4,679,926 | 7/1987 | Suzuki et al. | 354/173.11 |

FOREIGN PATENT DOCUMENTS 55-143550  1/1980  Japan .
57-201221  4/1982  Japan .

*Primary Examiner*—Michael L. Gellner
*Assistant Examiner*—David M. Gray
*Attorney, Agent, or Firm*—Fitzpatrick, Cella, Harper & Scinto

[57] ABSTRACT

A camera is arranged such that when a film housed in a film cartridge is loaded into a film cartridge chamber of the camera with a leader portion of the film remaining outside the camera and upon closure of the film cartridge chamber, the leader portion of the film is retracted into the camera and the film is wound onto a film winding spool. This camera comprises a retracted-amount measuring system for measuring the retracted-amount of film when the leader portion thereof is retracted into the camera and a wound-amount detector responsive to an output of the retracted-amount measuring system to determine the amount of the film wound onto the film winding spool.

31 Claims, 5 Drawing Sheets

CAMERA

This application is a continuation of application Ser. No. 036,718 filed Apr. 10, 1987, now abandoned.

BACKGROUND OF THE INVENTION

1. Field of the Invention

The present invention relates to a camera of easy film loading type which is so arranged that when a film housed in a film cartridge is loaded into a film cartridge chamber of the camera in such state that a leader portion of the film remains outside the camera and then a closure of said film cartridge chamber is closed, the leader portion of the film is retracted into the camera and then the film is wound onto a film winding spool, whereby the film loading is completed.

2. Description of the Related Art

A camera of the type which makes use of a film of belt shape housed in a film cartridge has such disadvantage that it is very troublesome to load the film into the camera. Heretofore, various proposals have been made to simplify the film loading operation of the camera.

Recently the applicant has proposed a novel camera of easy film loading type in which the film loading operation is considerably simplified, which is disclosed in our copending U.S. patent application Ser. No. 026,267 filed on Mar. 16, 1987.

This novel camera of easy film loading type is so arranged that the film loading is completed, only by loading a film cartridge containing a film into a film cartridge chamber of the camera in such state that a leader portion of the film extending out of the film cartridge remains outside the camera and then closing a closure of the film cartridge chamber, without requiring any other operation. That is, according to the above-mentioned novel camera which has been proposed by the applicant, when the user of the camera closes the closure of the film cartridge chamber after loading the film cartridge into the film cartridge chamber in such state that the film leader portion extending out of the film cartridge remains outside the camera, the leader portion of the film exposed outside the camera is retracted into the camera and then idle rewinding operation is started to wind the film onto a film winding spool, whereby the film loading is automatically completed.

The camera having the above-mentioned performance, which has been previously proposed by the applicant, can effect the film loading operation in a very simple manner and, consequently, it can be very easily handled as compared with the conventional camera. However, it has a problem to be solved, as hereinafter described.

That is, the camera as described above is arranged to start idle winding of the film immediately after completion of operation of retracting the leader portion of the film into the camera (idle rewinding operation), and the idle winding amount of the film is predetermined as a constant value. Under the circumstances, if the user of the camera erroneously (or intentionally) pulled out substantial length of the leader portion of the film, which is exposed outside the camera, before starting the idle winding operation, the idle rewinding amount would be larger than the idle winding amount. In such a case, even when the idle winding operation has been completed, the already exposed portion of the film could not be completely wound onto the film winding spool but located at the position of an aperture of the camera. If photographing operation is started under such circumstances, the already exposed portion of the film would be used as a photographing film portion, resulting in failure of the photographing.

SUMMARY OF THE INVENTION

It is an object of the present invention to provide a camera of the above type in which the already exposed portion of the film cannot be used as a photographing portion even if any length of the film remains outside the camera before photographing.

With the object as described above, the present invention provides a camera which is so arranged that when a film housed in a film cartridge is loaded into a film cartridge chamber of the camera in such a state that a leader portion of the film remains outside the camera and then a closure of said film cartridge chamber is closed, said leader portion of the film is retracted into the camera and then the film is wound onto a film winding spool, which comprises retracted-amount measuring means for measuring the retracted-amount of film when the leader portion thereof is retracted into the camera and wound-amount deciding means responsive to an output of said retracted amount measuring means to decide amount of the film wound onto the film winding spool.

The other objects of the present invention will be understood from the description of embodiments which will be described with reference to the accompanying drawings.

DETAILED DESCRIPTION OF THE PREFERRED EMBODIMENTS

Figure 1:
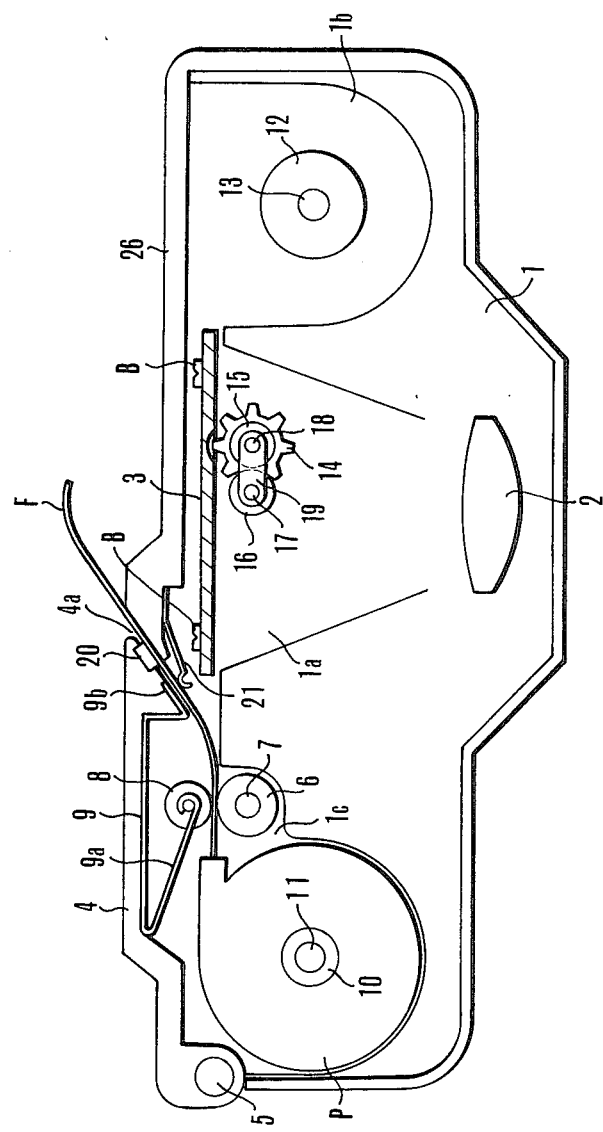
FIG. 1 is a diagrammatic sectional view taken along a horizontal plane, showing an embodiment of a camera according to the present invention.

Now, the present invention will be described, with reference to the preferred embodiments shown in the drawings.

Figure 2:
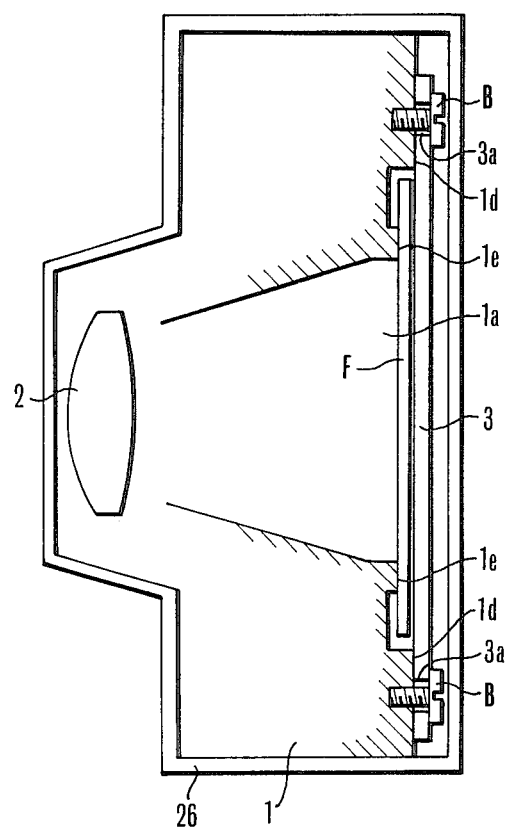
FIG. 2 is a diagrammatic sectional view taken along a vertical plane, of the camera shown in FIG. 1.
Figure 3:
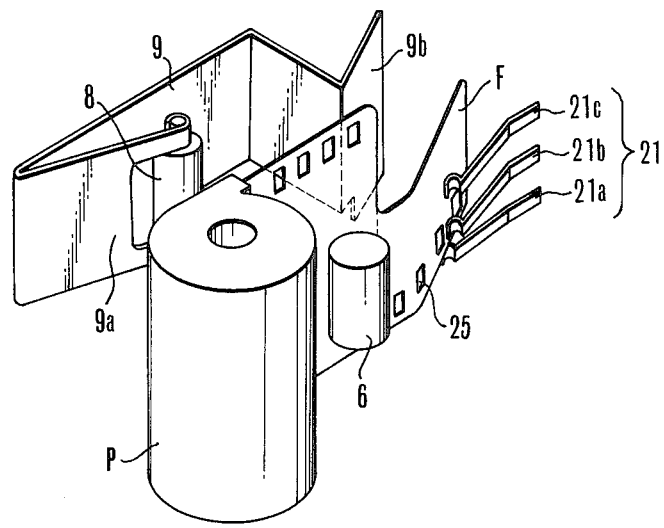
FIGS. 3 and 4 are enlarged perspective views showing parts of the camera shown in FIG. 1.
Figure 4:
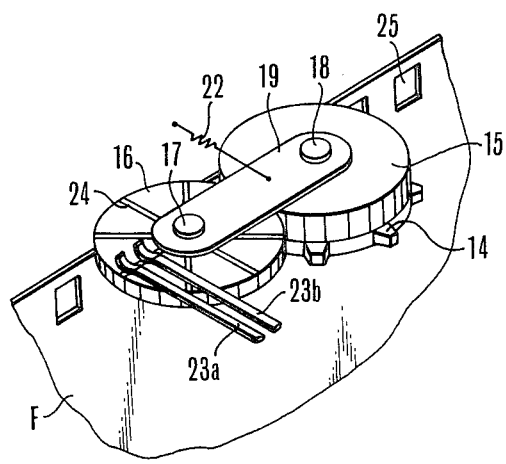

FIG. 1 is a diagrammatic sectional view taken along a horizontal plane showing a camera of easy film loading type to which the present invention is applied. FIG. 2 is a diagrammatic vertical sectional view of the camera shown in FIG. 1. FIGS. 3 and 4 are perspective views showing parts of the camera shown in FIG. 1.

Referring to FIGS. 1 and 2, the camera includes a camera body 1, a photographing lens 2 and a film pressing plate 3, which is fixed on the camera body, as hereinafter described. The camera body 1 has an aperture 1a, a spool chamber 1b, in which a spool 12 is housed, and a film cartridge chamber 1c, in which a film cartridge P containing a film F is housed. The spool 12 is rotated by a motor around a shaft 13. A fork 10 is rotatable around a shaft 11 and when the fork 10 is rotated in counterclockwise direction, as viewed in FIG. 1, the film F is rewound into the film cartridge P. A closure 4 for openably closing the film cartridge chamber 1c only is rotatably mounted on a shaft 5, and a metallic plate 9 having elastic property at its one end is fixed on the inside of said closure 4. The metallic plate 9 includes a roller holding portion 9a, which holds at its forward end a pinch roller 8 arranged to be pressed against a feeding roller 6, and an electrically conductive portion 9b arranged in opposed relation to a detecting switch 21 which will be hereinafter described in detail. The feeding roller 6 is rotatable around a shaft 7 fixed on the camera body 1 and it is connected with a driving gear train which is driven by the motor. A film entrance 4a is formed between said closure 4 and an opening edge of a rear cover 26 and a light shielding member 20 made of Moltoprene (soft polyurethane foam) or the like is adhered to the inside surface of the closure 4. The light shielding member 20 serves to close the film entrance 4a under the action of its own elastic property when the film F has been retracted into the camera, thereby preventing leakage of light into the camera through said film entrance.

In the camera as described above, there is no pressing plate nor pressing spring, which has been included in the conventional camera.

The film F is disposed in a space which is formed by a step portion formed between a so-called inner rail surface 1e and a so-called outer said surface 1d of the camera body and said film is subjected to restricting action of the film pressing plate 3, as shown in FIG. 2. In the particular embodiment as shown in the drawings, the flat film pressing plate 3 is fixed on the outer rail surface 1d by means of a plurality of set screws B and the film F is disposed in a film passage formed between the film pressing plate 3 and the inner rail surface 1e inside of the film. Screw passing holes 3a are formed in the film pressing plate 3 in the form of non-threaded holes having a diameter slightly larger than that of the set screw B, so that the position of the film pressing plate 3 can be adjusted when the set screws B are loosened.

FIG. 3 is a perspective view showing the mechanism for detecting the leader portion of the film in the camera shown in FIG. 1. Now, the detecting mechanism for detecting the leader portion of the film will be explained, with reference to FIGS. 1 and 3.

Referring to FIGS. 1 and 3, the metallic plate 9 fixed on the closure 4 includes the above-mentioned roller holding portion 9a and the electrically conductive portion 9b which is arranged to be electrically connected with a switching member of the detecting switch 21. The detecting switch 21 is disposed near the film entrance 4a and it includes a first contact piece 21a, a second contact piece 21b and a third contact piece 21c, said first contact piece 21a being arranged to constantly hold electrical contact with the electrically conductive portion 9b of the metallic plate 9 in the state where the closure 4 is closed. The second contact piece 21b of the detecting switch 21 is disposed at a position corresponding to perforations 25 formed in the film F and it is arranged to make contact with the electrically conductive portion 9b of the metallic plate 9 when said contact piece drops into any of the perforations 25. The third contact piece 21c is disposed above the second contact piece 21b so that said contact piece 21c does not drop into the perforations 25 and makes contact with said electrically conductive portion 9b only when the film F does not exist in the film entrance 4a.

Accordingly, the detecting switch 21 constitutes a perforation switch, as hereinafter described, which functions to detect the perforations 25 by means of the first contact piece 21a and the second contact piece 21b. Said detecting switch 21 also functions to detect the existence or non-existence of the film F by means of the first contact piece 21a and the third contact piece 21c. This detecting switch 21 is connected with a circuit disposed in the camera body as hereinafter described. The provision of the metallic plate 9 having the electrically conductive portion 9b, which is disposed on the inside surface of the closure 4, has such advantage that it eliminates the necessity of providing connecting means, such as flexible conductor, lead wire or the like, to connect the circuit in the camera body with the conductive portion on the inside surface of the openable closure 4. That is, the assembling of circuit parts of the camera is completed only on the side of the camera body, so that the mounting of the circuit is made in considerably easy manner.

FIG. 4 illustrates the detecting mechanism for detecting the film feeding amount of the camera. The arrangement of the detecting mechanism will be explained, with reference to FIGS. 1 and 4. The detecting mechanism includes a sprocket 14 for detecting the film feeding amount, which has a sprocket first gear 15 formed integrally therewith, and the sprocket 14 and the first gear 15 are rotatably supported by a shaft 18 fixed on a connecting plate 19. A sprocket second gear 16 is rotatably supported by a shaft 17 fixed on the camera body 1, and it constantly makes meshing engagement with the sprocket first gear 15. On the other hand, the connecting plate 19 is rotatable around the shaft 17 and it is energized in counterclockwise direction by means of a spring 22. The sprocket first gear 15 has same number of teeth as those of the sprocket second gear 16 and the sprocket 14 has eight sprocket teeth which are arranged to come into engagement with the perforations 14 of the film. Accordingly, the sprocket 14 makes one revolution as one frame of the film is fed forward. Counting contact pieces 23a and 23b are arranged to detect one revolution of the sprocket 14. These counting contact pieces 23a and 23b constitute a sprocket switch, as hereinafter described, which is arranged to produce pulse signals at every time when they come into contact with eight electrically conductive patterns printed on the sprocket second gear 16.

Now, the operation of the mechanical constituent parts at the time of using the camera will be explained.

At the time of film loading, the closure 4 is opened and the film cartridge P is inserted into the film cartridge chamber 1c. Then the closure 4 is closed in such state that the leader portion of the film F remains outside the camera.

When the closure 4 is closed, a closure switch, as hereinafter described, is turned on and at the same time the film detecting switch for detecting the existence of the film in the film entrance 4a is turned off. (As hereinbefore described, the film detecting switch is constituted by the first contact piece 21a and the third contact piece 21c and these contact pieces are electrically insulated from each other when the film F exists in the film entrance 4a.) The signals produced by the above switches are fed to a control circuit, as hereinafter described, which drives a motor, as hereinafter described, with the result that the fork 10 is rotated in counterclockwise direction to retract the film F into the film cartridge P. That is, the idle rewinding operation is started.

Before starting of the rewinding operation, the control circuit, as hereinafter described, makes the following preparatory operation. That is, a predetermined number of pulses are fed into the counter in said control circuit by idle-winding amount setting means and said counter is prepared to add the idle-rewinding amount to the integrated value of said pulses. When such preparatory operation has been completed, the idle rewinding of the film F is started at once.

When the idle rewinding operation is started the film F starts movement into the camera through the film entrance 4a. The second contact piece 21b for detecting the perforations 25 repeatedly comes into contact with the conductive portion 9b of the metallic plate 9 through the perforations 25 and, consequently, the first contact piece 21a and the second contact piece 21b repeatedly come into conductive contact with each other, whereby pulse signals corresponding to the number of the perforations passing the second contact piece 21b are fed into the control circuit, as hereinafter described, which is connected with the first contact piece 21a and the second contact piece 21b. The pulse signals are integrated by the counter provided in said control circuit. In the camera according to this embodiment, before starting the operation of detecting the idle rewinding amount the predetermined number of pulses are previously integrated in said counter and then the number of the idle-rewinding detecting pulses are added thereto, as explained above. Accordingly, the number of the idle rewinding detecting pulses as stored in said counter is larger than the number of the actual idle-rewinding detecting pulses. In this regard, it is to be noted that at the time immediately after the idle-rewinding has been completed, the number of pulses stored in said counter becomes equal to a set value for the idle-winding amount. This set value corresponds to the amount of the film, which is wound on the spool 12, enough to prevent the already exposed portion of the film from being used again as a photographing portion of the film and it is necessarily larger than the idle-rewinding amount, as explained above.

When the end of the leader portion of the film passes the third contact piece 21c at the final stage of the idle rewinding process, the third contact piece 21c comes into contact with the conductive portion 9b of the metallic plate 9, so that the first contact piece 21a and the third contact piece 21c are electrically connected with each other through said conductive portion 9b. (That is, the film detecting switch consisting of these contact pieces is turned on.) Accordingly, said control circuit functions to momentarily stop feeding of electric power to the motor and then reverse the feeding direction of the electric power at once, thereby starting the motor in the film winding direction (that is, the direction for unwinding the film from within the film cartridge). When the motor is rotated in the film winding direction, the film F is unwound toward the aperture under the action of the feeding roller 6 and the pinch roller 8. When the forward end of the film F comes into contact with the sprocket 14, said sprocket 14 is pushed sideward from the film running path under the action of the film F, while the teeth of the sprocket 14 come into engagement with the sprocket 25 of the film F. In other words, when the forward end of the film F comes into contact with the sprocket 14, the connecting plate 19 is rotated in clockwise direction, as viewed in FIG. 3, around the shaft 17 against the action of the spring 22, so that the sprocket 14 is moved away from the running path of the film F to the side thereof, so that the perforations 25 of the film F can easily come into engagement with the teeth of the sprocket 14.

When the teeth of the sprocket 14 have engaged with the perforation 25 of the film F, the sprocket 14 starts its rotation with the running of the film F, so that the sprocket 14 is rotated at a speed proportional to the moving amount of the film. Accordingly, the rotation is transmitted through the first gear 15 to the sprocket second gear 16, so that the conductive pattern 24 on the second gear 16 is rotated, and the contact pieces 23c and 23b holding contact with said conductive pattern 24 produce electric pulse signals corresponding to the film moving amount (in this case, the film idle winding amount). (In this connection, it is to be noted that the switch consisting of the counting contact pieces 23a and 23b and the conductive pattern 24 is connected as a sprocket switch in the control circuit to be explained later.)

The idle winding amount of the film is electrically detected, on the basis of the rotation of said sprocket 14 and when the detected value reaches a predetermined value which was set by said control circuit, that is a value corresponding to the amount enough to prevent the already exposed portion of the film from being used again as a photographing portion of the film, (the latter value is set by said control circuit as a value which is at any time larger than the detected value of the idle rewinding amount, as hereinbefore explained), the feeding of electric power to the motor is stopped and the idle winding operation is completed.

Now, the control circuit for producing the above-mentioned operation of the mechanical components (mainly, the motor) and the status of operation will be explained.

Figure 6:
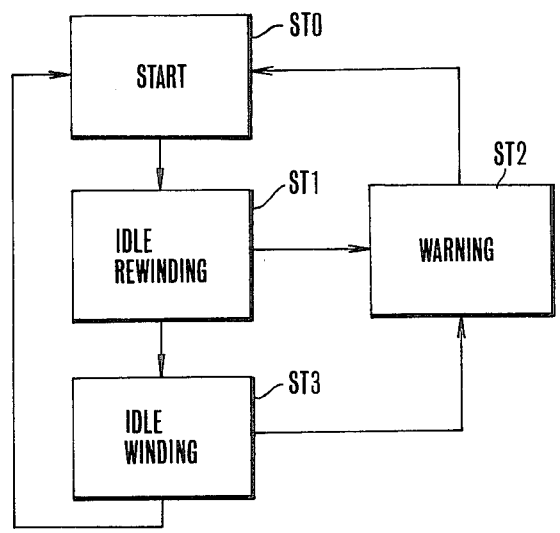
FIG. 6 is a diagram showing transition of status of the control circuit shown in FIG. 5.

FIG. 6 is a diagram showing a part of transition of status of the camera according to the above embodiment. In FIG. 6, the status in which the power source is connected and the camera is ready for photographing is indicated by the START status, ST 0. When the film has been loaded and the closure has been closed while the idle winding has not been effected, the status is changed to the status ST 1, where an instruction for idle rewinding operation is issued. In the status ST 1, the loaded film is rewound into the film cartridge. In the process of rewinding the film into the film cartridge, the forward end of the film is detected and when the film has been completely retracted into the camera, the status is changed to the status ST 3 where an instruction for the idle winding operation is issued. If the film is accidentally stopped during the rewinding operation for some reason, for example, when the film has been caught by a part of the camera or the like (such an accidental stop can be detected by the fact that the signal of the above-mentioned perforation switch is not fed within the predetermined time previously set by the timer), it is judged that the normal operation cannot be continued and the status is changed to ST 2, where the warning is indicated by sound or LED and the feeding of electric power to the motor is stopped.

When the status is changed to ST 3, the idle winding is started. When a predetermined number of the pulses produced by the above-mentioned perforation switch has been counted it is judged that the idle winding has been completed and the status is returned to ST 0. In the same manner as in ST 1, if the sprocket signal (the signal of said sprocket switch) is not fed within the predetermined time owing to the accidental stop of the film on such reason why the film has been caught by some part of the camera, the status is changed to ST 2, where the warning is produced. If the closure is opened during the warning, the status is returned to the initial status, ST 0, and the operation is restarted from the beginning. That is, if the idle rewinding operation or the idle winding operation fails, the feeding of electric power to the motor is interrupted and the warning is produced.

Figure 5:
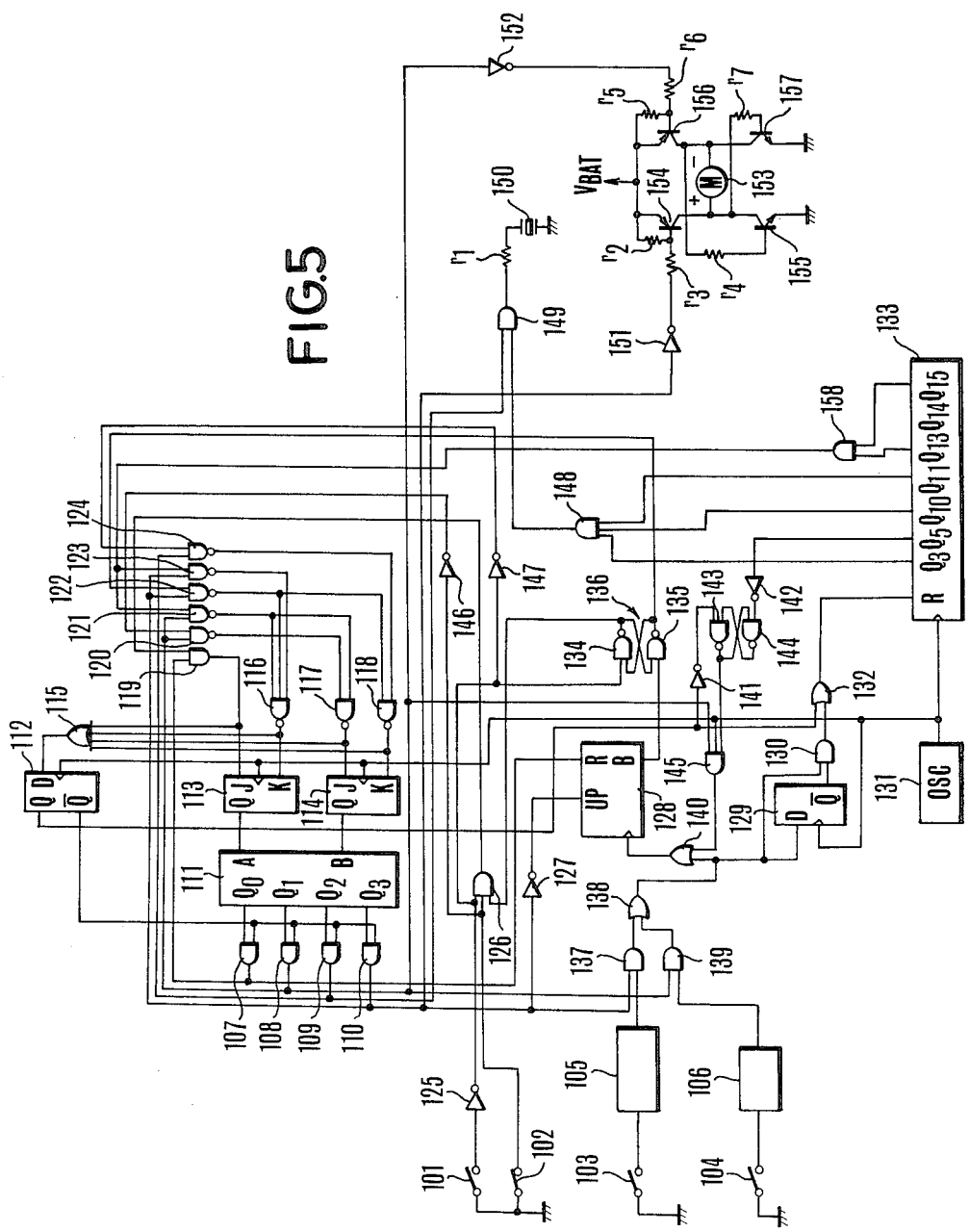
FIG. 5 is a circuit diagram showing a control circuit for the camera shown in FIG. 1.

FIG. 5 illustrates an embodiment of the control circuit for producing the functions of the camera as explained above.

The circuit shown in FIG. 5 includes a closure switch 101 arranged to be closed when the closure 4 is closed and a film detecting switch 102 which consists of the third contact piece 21c and the first contact piece 21a as shown in FIG. 2. The film detecting switch 102 is opened when the film is positioned in the film entrance 4a, as shown in FIG. 1, while it is closed when the idle rewinding operation has been completed. The circuit further includes a sprocket switch 103 (hereinafter referred to as sprocket SW) arranged to detect the idle film winding amount at the time of idle film winding operation. The switch 103 consists of the counting contact pieces 23a and 23b, as shown in FIG. 3, and it is repeatedly turned on and off as the film moves. The circuit further includes a perforation switch 104 (hereinafter referred to as perforation SW) which is arranged to engage with the perforations of the film when said film is subjected to the idle film rewinding operation in the state as shown in FIG. 1, in order to detect the idle rewinding amount of the film. Said switch 104 consists of the second contact piece 21b and the first contact piece 21a of the switch 21 as shown in FIG. 2 and it is turned on every time when the forward end of the second contact piece 21b drops into the perforations 25 during the film idle rewinding process.

When each of the switches as mentioned above is turned on, a line in which said switch is connected produces a potential drop, that is, a pulse at low level "L" is produced in said line.

The circuit includes chatter absorbing circuits 105 and 106, a decoder 111, D-type flip-flops 112, 129 (hereinafter referred to as D-FF), JK-type flip-flops 113 and 114 (hereinafter referred to as JK-FF), a counter 128 for counting the idle rewinding amount and the idle winding amount, an oscillator 131 for producing clock pulses, a main counter 133 for controlling timing of operation sequence of the whole circuit, a motor 153 for winding and rewinding the film, transistors 154-157 for controlling feeding of electric current to the motor 153, a warning device 150 such as buzzer or the like, and resistors r1–r7. A latch 136 (self holder circuit) consisting of NAND gates 134 and 135 is arranged to be controlled by the operation of the closure switch 101 and an output at BORROW terminal B of the counter 128 and to control an AND gate 126 and a NAND gate 122.

A RS flip-flop (hereinafter referred to as RS-FF) is constituted by inverters 141 and 142 and NAND gates 143 and 144, and said RS-FF and an AND gate 145 connected to the output terminal thereof constitute the idle winding amount setting means for setting the idle winding amount in the counter 128. The conducting period of said RS-FF is controlled by an output pulse at Q5 terminal of the main counter 133 while the resetting and the inversion thereof are controlled by the D-FF 112. The AND gate 145 serves to lead clock pulses produced by the oscillator 131 through an OR-gate 140 to the counter 128. The conducting time of said AND gate 145 is controlled by an output at Q1 terminal of the decoder 111, while the conducting period of said AND gate is controlled by the output of said RS-FF (that is, the output of NAND gate 143).

The decoder 111 is arranged to generate outputs for controlling several parts of the circuit in accordance with the operations of the above-mentioned switches 101 and 102, and this decoder 111 is controlled by the two JK-FF 113 and 114. The JK-FF 113 and 114 are controlled by the AND gate 119, NAND gates 116–118 and 120–124.

The main counter 133, AND gates 148, 149 and 158, NAND gates 121–124, NAND gates 116 and 117, JK-FF 113 and 114, decoder 111, warning device 150, etc. constitute an accident preventing means, which functions to stop feeding electric power to the motor 153 and provide warning, in response to the output of the abnormal-state detecting means constituted by the D-FF 129 and AND gate 130. The abnormal-state detecting means constituted by the D-FF 129 and AND gate 130 functions to detect the fact that the film movement detecting pulse is not fed within the predetermined time.

Now the operation of the circuit after the loading of the film into the camera will be described, with reference to FIG. 5. In this connection it is to be noted that before loading the film the voltage levels at the Q output terminals of the JK-FF 113 and 114 are set at "L" (low level) and accordingly the decoder 111 produces "H" output only at its Q0 terminal. the output levels of the AND gate 119 and the NAND gates 116–118 are "L", the output level of the OR gate 115 is "L", the output level of the $\overline{Q}$ terminal of the D-FF 112 is "H", and the output level of the Q terminal of the D-FF 112 is "L". The output of the NAND gate 134 which constitutes the latch 136 is held at "H" level when the closure switch 101 is open and, consequently, two of the three inputs of the AND gate 126 are at "H" level.

On the other hand, the output of the AND gate 107, which is connected to Q0 terminal of the decoder 111, is at "H" level and, therefore, the counter 128 is in its reset state. The Q terminal output of the D-FF 112 is at "L" level so that the main counter 133 is in non-reset state. The main counter 133 functions to effect frequency division of the clock pulses produced by the oscillator 131 into pulses having various frequencies and feed these pulse signals in the form of time series signals from a plurality of output terminals Q1–Qn thereof.

When the closure 4 is closed after the film cartridge P has been inserted into the film cartridge chamber 1c of the camera, the closure switch 101 is closed and the film detecting switch 102 is opened. Accordingly, the output level of the inverter 125 becomes "H" and, consequently, both levels of the input to the NAND gate 134 of the latch 136 and the input to the AND gate 126 become "H". It is to be noted that in the latch constituted by the NAND gates 134 and 135 the output of the NAND gate 134 is held at "H" level when the closure switch 101 is open and, consequently, when the closure switch 101 is closed and the input level of the AND gate 126 from the inverter 125 become "H", the output level of the AND gate 126 also changes from "L" to "H", with the result that one of the input levels to the AND gate 119 becomes "H". At this stage the output level of Q0 terminal of the decoder 111 is "H" and the output level of $\overline{Q}$ terminal of the D-FF 112 is "H", as described above, so that the input level of the AND gate 119 from the AND gate 107 is "H". Accordingly, when the output level of the AND gate 126 becomes "H", the output level of the AND gate 119 changes from "L" to "H". Thus, when an input is applied to J terminal of the JK-FF 113, the output level of Q terminal of the JK-FF 113 becomes "H", in synchronized relation to rise of the clock pulse applied to the clock terminal of the JK-FF 113 from the oscillator 131, with the result that an input is applied to A terminal of the decoder 111. Accordingly, the output of the decoder 111 is changed from Q0 to Q1 and the output level of Q1 terminal changes from "L" to "H", while the output level of Q0 terminal becomes "L". Thus the status changes from ST 0 to ST 1, in FIG. 6.

When the output level of the AND gate 119 becomes "H", the output level of the OR gate 115 also becomes "H", so that an input at "H" level is applied to D terminal of the D-FF 112. Thus, the output level of the Q output terminal of the D-FF 112 becomes "H", in synchronized relation to rise of the clock pulse applied to the clock terminal of the D-FF 112 from the oscillator 131, with the result that the main counter 133 is reset. At the same time, the output level of the $\bar{Q}$ terminal of the D-FF 112 becomes "L". When the $\bar{Q}$ output level of the D-FF 112 becomes "L", the output level of the AND gate 107 changes from "H" to "L", while the output level of the AND gate 119 becomes "L", so that the output level of the OR gate 115 also becomes "L", with the result that the input to D terminal of the D-FF 112 becomes "L". Accordingly, the levels of the Q and $\bar{Q}$ output terminals of the D-FF 112 are changed, in synchronized relation to rise of the clock input and the Q output level is returned to "L", while the $\bar{Q}$ output level is returned to "H". That is, the Q output level of the D-FF 112 becomes "H" during the time of only one clock when the status is changed.

When the output level of the AND gate 108 becomes "H", one of the input levels of the AND gate 139 becomes "H", while one of the input levels of the AND gate 145, which constitutes a part of the idle winding amount setting means, becomes "H", so that the AND gate 145 becomes synchronized state with the output signal of the Q terminal of the main counter 133, whereby the clock pulse produced by the oscillator 131 is applied through the OR gate 140 to the counter only for the period corresponding to the gate selecting time as hereinafter described. Accordingly, a predetermined number of pulses are set in the counter 128. This predetermined number of pulses corresponds to a spare number of pulses required to set the idle winding amount larger than the idle rewinding amount (that is, a difference between the idle winding amount and the idle rewinding amount) and, in the embodiment now described, this spare number of pulses is set as sixteen pulses. (However, this number of pulses may be set as a desired number, other than sixteen.)

When the above-mentioned spare number of pulses are applied through the AND gate 145 to the counter 128, up-counting operation (adding operation) is effected in the counter 128. In this regard, it is to be noted that the counter 128 is arranged to effect up-counting operation when the signal level applied to the up-terminal is "H" and to effect down-counting operation when the signal level applied to said terminal is "L". In the above-mentioned state, where only the output level of the AND gate 108 is "H", the output level of the inverter 127 is "H", so that the counter 128 is set in its up-counting state.

The above-mentioned gate selecting time of the AND gate 145 depends upon the switching time of the RS-FF constituted by the NAND gates 143 and 144 and the inverters 141 and 142. (That is, the above gate selecting time depends upon the frequency of Q5 output of the main counter 133.)

When the output level of the Q5 output of the main counter 133 becomes "H", said RS-FF is reset and the AND gate 145 becomes into non-selecting state so that the input to the counter 128 disappears.

On the other hand, in the state ST 1, the motor 153 is driven to effect the idle film rewinding operation, as described with reference to FIG. 6, in the circuit operation as hereinafter explained. That is, the output level of the Q1 terminal of the decoder 111 becomes "H", as described above, and when the output level of the $\bar{Q}$ terminal of the D-FF 112 becomes "H", the output level of the AND gate 108 becomes "H", with the result that the output level of the inverter 152 becomes "L". Accordingly, the base potential of the PNP transistor 156 is lowered and said transistor 156 is turned on. When the transistor 156 is turned on, the collector potential thereof is increased and, consequently, the base potential of the transistor 155 connected to the collector of the transistor 156 is increased. Thus the transistor 155 is turned on, with the result that current is fed from the power source $V_{BAT}$ to the motor 153 through the circuit (the collector of the transistor 156)→(motor 153)→(collector of the transistor 155), so that the motor 153 is rotated in the reverse direction (that is, the film rewinding direction).

When the motor 153 is rotated in the reverse direction, as described above, the fork 10 is rotated in counterclockwise direction, as viewed in FIG. 1, so that the film portion exposed outside the camera and the film portion existing in the film entrance are rewound into the film cartridge P. The idle rewinding amount is stored in the control circuit in the form of electric pulses which are produced every time the forward end of the second contact piece 21b of the switch 21 drops into each of the perforations 25, in the manner as hereinafter described.

That is, when the film F is subjected to the idle rewinding operation, the perforation SW 104 as shown in FIG. 5 repeats its on-off operation, with the result that the pulses produced thereby is shaped in the chatter absorbing circuit 106 and then applied to the AND gate 139. At this stage, the output of the AND gate 108, which forms one of the inputs of the AND gate 139, is at "H" level, so that the AND gate 139 is selected. The OR gates 138 and 140 are also in their selected states, so that the pulses produced by the on-off operation of the perforation switch 104 are fed to the counter 128, which functions to count and store the number of the pulses. Accordingly, the number of pulses corresponding to the idle rewinding amount is added to the previously set spare number of pulses and the resultant value of the number is stored as a value which corresponds to the value enough to prevent the already exposed portion of the film from being used again as a photographing portion of the film.

The completion of the idle rewinding operation is detected by the fact that the third contact piece 21c arranged to detect the forward end of the film leader portion comes into contact with the conductive portion 9b so that the first contact piece 21a and the third contact piece 21c are electrically connected together through said conductive portion 9b. At this moment (that is, when the first contact piece 21a and the third contact piece 21c contact with the conductive portion 9b), the film detecting switch 102 in FIG. 5 is reclosed, with the result that the output level of the inverer 146 becomes "H", the output level of the NAND gate 120 becomes "L"and the output level of the NAND gate 117 becomes "H", so that "H" level signal is applied to J input terminal of the JK-FF 114. Accordingly, the output level of the Q terminal of the JK-FF 114 becomes "H"in synchronized relation to rise of the clock pulse applied to the JK-FF 114, with the result that "H"level signal is applied to B terminal of the decoder 111. Accordingly, the output level of the Q1 terminal of the decoder 111 becomes "L" and the motor 153 is stopped, while an "H" level output signal is produced at the Q3 terminal.

On the other hand, the output level of the NAND gate 117 becomes "H", so that an "H" level signal is applied through the OR gate 115 to the D Terminal of the D-FF 112, with the result that the output level of the Q terminal of the D-FF 112 becomes "H" in the same manner as described above and the main counter 133 is reset through the OR gate 132. The $\bar{Q}$ terminal output level of the D-FF 112 becomes "L", so that the output level of the AND gate 108 becomes "L", the output levels of the NAND gates 120 and 121 become "H" and the output level of the NAND gate 117 becomes "L", with the result that the D input level of the D-FF 112 becomes "L" through the OR gate 115. Thus, the output level of the Q terminal of the D-FF 112 becomes "L" again in the same manner as described above, while the output level of the $\bar{Q}$ terminal of the D-FF 112 becomes "H".

Accordingly, the output level of the AND gate 110 becomes "H" and the output level of the inverter 151 becomes "L", so that the base potential of the PNP transistor 154 is lowered and said transistor 154 is turned on. When the transistor 154 is turned on, the collector potential thereof is increased and the base potential of the NPN transistor 157 is increased. When the base potential of the transistor 157 is increased, the transistor 157 is turned on, with the result that a current passes from the power source $V_{BAT}$ through the transistor 154, the motor 153 and the transistor 157, and the motor 153 is forwardly rotated in the film winding direction.

Accordingly, the feeding roller 6 is rotated in clockwise direction, as viewed in FIG. 1, whereby the film F is drawn out of the film cartridge P and is fed in parallel with the film pressing plate 3.

On the other hand, since the output level of the AND gate 110 is "H", the output level of the inverter 127 becomes "L", with the result that the counter 128 is changed to the down-counting (subtracting) state. The output of the AND gate 110 is applied to the AND gate 137, and the counter 128 is prepared to receive the pulses produced by the sprocket SW 103.

When the forward end of the film passes over the teeth of the sprocket 14 and then the perforations 25 of the film come into engagement with the teeth of the sprocket 14, the sprocket SW 103 starts on-off operation, depending upon the amount of movement of the film. The pulses produced in the line of said switch 103 are shaped by the chatter absorbing circuit 105 and then applied to the AND gate 137. Accordingly, the output pulses of the AND gate 137 are applied through the OR gates 138 and 140 to the counter 128. The counter 128 functions to subtract the number of pulses fed from the sprocket SW 103 from the previously stored number of (idle rewinding amount+spare pulses), which corresponds to the amount enough to prevent the already exposed portion of the film from being used again as a photographing portion of the film.

On the other hand, the pulses produced by the on-off operation of the switch 103 are applied to the counter 128, as described above, and at the same time they are applied to the data terminal of the D-FF 129 and the AND gate 130. As the rise part of said pulse is fed to the D-FF 129, the output level of the $\bar{Q}$ terminal becomes "H" in synchronized relation to the clock pulse applied to the D-FF 129. Accordingly, one-shot "H" pulse is produced at the output terminal of the AND gate 130 and said one-shot pulse is applied through the OR gate 132 to the resetting terminal R of the main counter 133, so that the main counter 133 is reset.

As the idle film winding operation proceeds, until the number of the pulses fed from the switch 103 into the counter 128 becomes equal to the above-mentioned value, a "L" level signal is generated from the BARROW terminal B of the counter 128 and this level is applied to the NAND gate 135 of the latch 136. Thus, the output level of the NAND gate 135 becomes "H" and the fact that the idle winding operation has been completed is stored in the latch 136. At this moment, the "H" level output of the AND gate 110 is applied to the NAND gate 122, to which the output of the NAND gate 135 is applied, and, consequently, the output level of the NAND gate 122 becomes "L", while the output levels of the NAND gates 116 and 118 become "H". Accordingly, the K terminals of the JK-FF 113 and 114 receive the "H" level signal, so that the output levels of the Q terminals of the JK-FF 113 and 114 become "L". Thus the decoder 111 returns to its initial state and the "H" level output is produced only at the Q0 terminal. The circuit becomes ready-for-photographing state (that is, it returns to the status ST 0), where no signal is fed to the motor driving circuit and the motor 153 is stopped. Thus the idle winding has completed.

In the above-described embodiment of the camera, the number of pulses equal to [(idle winding amount-)—(idle rewinding amount)] are previously integrated in the counter 128 before the operation of detecting the idle rewinding amount so that the idle winding amount be larger than the idle rewinding amount and then the pulses of the idle rewinding detection are added to the above-mentioned number of pulses, to determine the set value for the idle winding. Accordingly, the idle winding amount cannot be smaller than the idle rewinding amount under any circumstances.

In the above-mentioned embodiment of the invention, when an abnormal state of movement of the film arises during the film idle rewinding or winding process, for example, when the film is caught by a part of the camera and stopped thereby, the pulses produced by the switch 104 or the switch 103 disappear, so that no pulse input is fed to the D-FF 129 and the AND gate 130, which constitute the abnormal state detecting means, and the one-shot pulse is not produced from the AND gate 130, with the result that the resetting of the main counter 133 is not effected. Therefore, the output level of the AND gate 158 becomes "H" after a predetermined time, by the pulses produced from the Q13 and Q15 terminals of the main counter 133. (This time can be determined as any desired time and, in the above embodiment, it is determined to be 2.5 sec.)

Accordingly, the output level of the NAND gate 121 or 123, to which the output of the AND gate 158 is applied, becomes "L", and, consequently, the output levels of the NAND gates 116 and 117 become "H". The output level of the Q terminal of the JK-FF 113 becomes "L", while the output level of the Q terminal of the JK-FF 114 becomes "H", and thus the decoder 111 becomes into the state where an input is applied only to the B terminal thereof. Accordingly, the decoder 111 produces "H" output at the Q2 terminal and "L" output at the Q1 terminal or the Q3 terminal.

Thus, both of the outputs of the AND gates 108 and 110 become "L", so that both of the outputs of the inverters 151 and 152 become "H", with the result that the transistors 156 and 155 or 154 and 157, which serve to feed a current to the motor 153, are turned off and the rotation of the motor 153 is stopped. Since the outputs levels of the NAND gates 116 and 117 have become "H" immediately before the output terminal of the decoder 111 has been changed to Q2, a "H" input is fed to the input terminal of the D-FF 112 through the OR gate 115 and, consequently, the output level of the Q terminal of the D-FF 112 becomes "H", while the output level of the $\bar{Q}$ terminal becomes "L". Accordingly, in the same manner as described above, the main counter 133 is reset through the OR gate 132 by the Q output of the D-FF 112 and at the same time the RS-FF is reset. The output of the $\bar{Q}$ terminal of the D-FF 112 becomes "L" for one pulse and then returns to "H", in the same manner as described above.

Accordingly, the output of the AND gate 109 becomes "H", and is applied to the AND gate 149, while the main counter 133 functions to feed its Q3 output, Q10 output and Q11 output to the AND gate 148 and feed the output from the AND gate 148 to the AND gate 149 as another input thereof, so that the warning device 150 is energized, to provide a sonic alarm.

If the closure 4 is opened during the operation of the warning device 150 as described above, the switch 101 is opened. Consequently, the output level of the inverter 125 becomes "L", the output level of the inverter 147 becomes "H", the output level of the NAND gate 124 becomes "L", the output level of the NAND gate 118 becomes "H" and the output level of the JK-FF 114 becomes "L". Therefore, both inputs to the decoder 111 from the two JK-FF become "L", with the result that the output of the decoder 111 becomes Q0 and thus the operation of the warning device 150 is interrupted, while the camera returns to its ready-for-photographing state.

Figure 7:
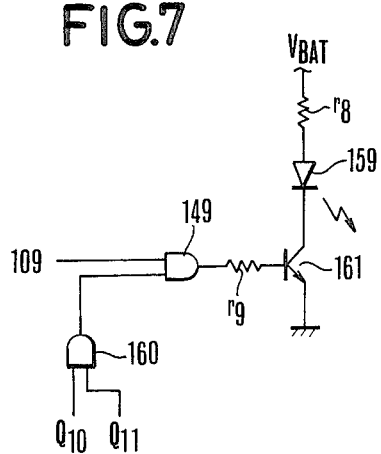
FIG. 7 is a circuit diagram showing a modified form of a part of the control circuit shown in FIG. 5.

FIG. 7 shows an embodiment of a visual warning device in which LED 159 is used. In FIG. 7, the constituent elements indicated by the same symbols as used in FIG. 5 are same circuit elements as in FIG. 5, respectively. In FIG. 7, r8 and r9 indicate resistors and $V_{BAT}$ indicates a power source.

In this embodiment, a first input to the AND gate 149 is produced by the AND gate 160 which operates in response to two outputs Q10 and Q11 of the main counter, while a second input to the AND gate 149 is produced by the AND gate 109 shown in FIG. 5. The output terminal of the AND gate 109 is connected to the base of the transistor 161 for driving the LED 159. Accordingly, if the movement of the film is obstructed during the film winding operation, the AND gate 160 becomes conductive by the action of two outputs Q10 and Q11 produced by the main counter 133 and at the same time the AND gate 149 becomes conductive by the action of output produced by the AND gate 109, thereby causing the transistor 161 to be conductive, so that the LED 159 turns on and off.

In the above explanation of the embodiment of the present invention, the means for detecting the film feeding amount was described as consisting of the sprocket. However the means for detecting the film feeding amount is not limited thereto but it may consist of photoelectric detecting system which may be a photocoupler or the like. Furthermore, the construction may be so modified that if the closure is closed without loading the film, the idle rewinding operation is not effected and the idle winding operation is started. In such modification, however, it is preferable to provide a timer circuit which functions to stop feeding of electric power to the motor after a predetermined time. Also, the construction may be so modified that only the first contact piece 21a and the second contact piece 21b are utilized, without using the third contact piece 21c, and such sequence is included that if the perforation signal as described above is not produced within a predetermined time a state equivalent to the closed state of the film detecting switch 102 is formed by a signal fed from a timer, whereby the idle rewinding operation is interrupted and the idle winding operation is started.

As described above, the present invention provides a camera which is so arranged that when a film housed in a film cartridge is loaded into a film cartridge chamber of the camera and a closure of said film cartridge chamber is closed in such state that a leader portion of the film remains outside the camera, said leader portion of the film is retracted into the camera and then the film is wound onto a film winding spool, in which such improvements are included that an already exposed portion of the film cannot be used as a photographing film portion even when any length of the film is remained outside the camera at the time of photographing. The improvements provided by the present invention are very valuable in the actual use of the camera.

What is claimed is:

1. A camera of the type in which when a film housed in a film cartridge is loaded into a film cartridge chamber of the camera and a closure of said film cartridge chamber is closed in such state that a leader portion of the film remains outside the camera, said leader portion of the film is retracted into the camera and then the film is wound onto a film winding spool, comprising:
   (A) retracted-amount measuring means for measuring a retracted amount of the film when the leader portion of the film is retracted into the camera; and
   (B) winding-amount deciding means responsive to an output of said retracted-amount measuring means to decide an amount of the film wound onto the film winding spool.

2. A camera according to claim 1, in which said retracted-amount measuring means includes means for detecting an amount of movement of perforations formed in the film.

3. A camera according to claim 1, in which said winding-amount deciding means includes means for winding a sufficient amount of the film to prevent an already exposed portion of the film from being used as a photographing portion of the film.

4. A camera according to claim 1, in which said winding-amount deciding means includes means for feeding larger amount of the film to said film winding spool than the retracted amount of the leader portion of the film retracted into the camera.

5. A camera according to claim 1, in which said winding-amount deciding means includes detecting means for detecting an amount of movement of perforations formed in the film.

6. A camera according to claim 5, in which said detecting means includes a sprocket arranged to engage with the perforations and to detect the amount of movement of said perforations, said sprocket being movable into or out of a moving path of the film.

7. A camera according to claim 6, in which said detecting means includes energizing means for energizing said sprocket to move said sprocket into the moving path of the film.

8. A camera wherein a film cartridge substantially containing a film is loaded into the camera such that a portion of film extending outside of the film cartridge initially remains outside of the camera, and after the film remaining outside of the film cartridge is retracted into the camera, the film is fed to a film take-up spool, comprising:
(A) a retracted amount measuring means for measuring the amount of the film retracted into the camera; and
(B) a feeding amount determining means for determining the amount of the film to be fed to the film take-up spool in response to an output of said retracted amount measuring means.

9. A camera according to claim 8, wherein the film has perforations formed therein, and said retracted amount measuring means includes detecting means for detecting an amount of movement of the perforations in the film.

10. A camera according to claim 8, wherein said feeding amount determining means includes means for feeding such an amount of the film that at least an already exposed portion of the film is not used for photography.

11. A camera according to claim 8, wherein said feeding amount determining means includes means for feeding to the take-up spool a larger amount of film than the amount of film retracted into the camera.

12. A camera according to claim 8, wherein the film has perforations formed therein, and said feeding amount determining means includes detecting means for detecting an amount of movement of the perforations in the film.

13. A camera according to claim 12, in which said detecting means includes a sprocket arranged to engage with the perforations and to detect an amount of movement of said perforations, said sprocket being movable into and out of a path of movement of the film.

14. A camera according to claim 13, in which said detecting means includes energizing means for energizing said sprocket to move said sprocket into a path of movement of the film.

15. A camera according to claim 8, wherein said feeding amount determining means includes detecting means for detecting an amount of the movement of the film, said detecting means being capable of being brought into and out of the path of movement of the film.

16. A camera according to claim 8, further comprising
(a) an electrically conductive contact plate disposed in a back of the camera, and
(b) first and second conductive members disposed in the back of the camera rearwardly of the path of movement of the film, whereby said first and second conductive members become electrically connected upon contact with said contact plate and electrically disconnected by interposition of the film between the contact plate and the first and second conductive members.

17. A camera according to claim 8, further comprising a holding means for holding rollers for moving the film.

18. A camera according to claim 8, further comprising a camera body member and a film pressing member arranged at an aperture portion of said camera body member, said pressing member being fixed to said camera body member.

19. A camera according to claim 18, further comprising position adjusting means for adjusting the position of said film pressing member.

20. A camera wherein a film cartridge substantially containing a film is loaded into the camera such that a portion of film extending outside of the film cartridge initially remains outside of the camera, and after the film remaining outside of the film cartridge is retraced into the camera, the film is fed to a film take-up spool, comprising:
(A) a retracted amount measuring means for measuring the amount of the film retracted into the film cartridge; and
(B) a feeding amount determining means for determining the amount of the film to be fed to the side of the film take-up spool in response to the output of the retracted amount measuring means.

21. A camera according to claim 20, wherein wherein the film has perforations formed therein, and said retracted amount measuring means includes detecting means for detecting an amount of movement of the perforations in the film.

22. A camera according to claim 20, wherein said feeding amount determining means includes means for feeding such an amount of the film that at least an already exposed portion of the film is not used for photography.

23. A camera according to claim 20, wherein said feeding amount determining means includes means for feeding to the take-up spool an amount of film larger than the amount of film retracted into the camera.

24. A camera according to claim 20, wherein the film has perforations formed therein, and said feeding amount determining means includes detecting means for detecting the amount of the movement of perforations formed in the film.

25. A camera according to claim 24, in which said detecting means includes a sprocket arranged to engage with the perforations and to detect the amount of movement of said perforations, said sprocket being movable into and out of a path of movement of the film.

26. A camera according to claim 25, in which said detecting means includes energizing means for energizing said sprocket to move said sprocket into the path of movement of the film.

27. A camera according to claim 20, wherein said feeding amount determining means includes detecting means for detecting the amount of the movement of the film, said means being capable of being brought into and out of a path of movement of said film.

28. A camera according to claim 20, further comprising
(a) an electrically conductive contact plate disposed in a back of the camera, and (b) first and second conductive members disposed in the back of the camera rearwardly of a path of movement of the film, whereby said first and second conductive members become electrically connected upon contact with said contact plate and electrically disconnected by interposition of the film between the contact plate and the first and second conductive members.

29. A camera according to claim 20, further comprising a holding means for holding rollers for moving the film.

30. A camera according to claim 20, further comprising a camera body member and a film pressing member arranged at an aperture portion of said camera body member, said pressing member being fixed to said camera body member.

31. A camera according to claim 30, further comprising position adjusting means for adjusting the position of said film pressing member.

* * * * *